United States Patent [19]

Coleman

[11] Patent Number: 4,882,775
[45] Date of Patent: Nov. 21, 1989

[54] DEMODULATION TECHNIQUE FOR COHERENCE MULTIPLEXED OPTICAL DATA TRANSMISSION SYSTEM

[75] Inventor: Jeffrey O. Coleman, Medina, Wash.

[73] Assignee: The Boeing Company, Seattle, Wash.

[21] Appl. No.: 222,960

[22] Filed: Jul. 22, 1988

[51] Int. Cl.$^4$ .............................................. H04B 9/00
[52] U.S. Cl. .................................. 455/617; 455/612; 455/619; 370/1; 350/96.14
[58] Field of Search ............... 455/600, 610, 612, 617, 455/618, 619; 370/1, 3; 350/96.12, 96.13, 96.14; 356/345

[56] References Cited

U.S. PATENT DOCUMENTS

| | | | |
|---|---|---|---|
| 2,385,086 | 9/1945 | D'Agostino et al. | 455/615 |
| 3,563,664 | 2/1971 | Campell et al. | 356/349 |
| 3,742,501 | 6/1973 | Urkowitz et al. | 342/192 |
| 3,761,716 | 9/1973 | Kapron et al. | 329/144 |
| 4,215,576 | 8/1980 | Quick et al. | 356/356 |
| 4,288,785 | 9/1981 | Papuchon et al. | 350/96.14 |
| 4,432,599 | 2/1984 | McMahon | 370/4 |
| 4,502,037 | 2/1985 | Le Parquier et al. | 350/96.14 |
| 4,553,101 | 11/1985 | Mathis | 370/4 |
| 4,799,797 | 1/1989 | Huggins | 350/96.14 |

OTHER PUBLICATIONS

Papuchon et al., "4-Bits Digitally Driven Intergrated Amplitude Modulator For Data Processing", *Electronic Letters*; Feb. 14, 1980, vol. 16, No. 4, pp. 142-144.
Goedgebuer, Salcedo and Vienot, "Multiplex communication via electro-optic phase modulation of white light", *OPTICA ACTA*, vol. 29, No. 4, pp. 471-477, (1982).

Primary Examiner—Robert L. Griffin
Assistant Examiner—Andrew J. Telesz, Jr.
Attorney, Agent, or Firm—Christensen, O'Connor, Johnson & Kindness

[57] ABSTRACT

An improved demodulator and demodulation method usable in a coherence multiplexed, optical data transmission system. The demodulator comprises an interferometer and a signal processor. The interferometer has first and second arms having first ends coupled to receive radiation from an optical bus, and second ends connected to the signal processor. The path length difference between the arms is selected to approximately match that of a corresponding modulator, to within the coherence length of the optical carrier. The signal processor processes the optical signals emerging from the arms in combination, to produce a pair of electrical ouput signals. Linearly independent pairs of electrical ouput signals are produced for any two modulation signals that do not produce modulator optical path length differences that differ from one another by an integral multiple of a half wavelength of the optical carrier. In a preferred embodiment, the electrical output signals correspond to the cosine and sine of the phase modulation angle produced in the associated modulator.

15 Claims, 4 Drawing Sheets

DEMODULATION TECHNIQUE FOR COHERENCE MULTIPLEXED OPTICAL DATA TRANSMISSION SYSTEM

FIELD OF THE INVENTION

The present invention relates to optical data transmission systems and, in particular, to an improved demodulation technique for use in such a system.

BACKGROUND OF THE INVENTION

In recent years, fiber-optic cables have been increasingly used for communications, particularly in telephone systems. Reasons for this increased usage include the facts that optical fibers are lighter in weight and less expensive than electrical conductors, and are not subject to electrical interference. Typically, a communication system includes a light source such as a laser diode or an LED, and a photodetector such as a photodiode, connected through a single mode or multimode fiber-optic cable. Information is transmitted in digital form, as a series of light pulses that form a bit stream.

In order to increase the information-carrying capacity of a fiber-optic cable, frequency and time division multiplexing techniques have been widely explored. Examples of prior art frequency division multiplexing optical communication systems are described in U.S. Pat. Nos. 4,326,243 and 4,592,043. However, a number of problems have been encountered in implementing such systems. These problems include frequency variations of the semiconductor light sources, matching of the multiplexer and demultiplexer coupling frequencies, and the need for relatively large channel spacing to accommodate aging effects and manufacturing tolerances of semiconductor lasers.

Choherence multiplexing is a comparatively new technique for carrying multiple data channels on a single optical fiber or waveguide. In a coherence multiplexed system, the transmitted information is carried in the values of the complex autocorrelation of self-coherence function of the transmitted optical signal at time delays that represent data channels. The advantages of coherence multiplexing are that it uses optical signal processing structures that are inherently simpler than those required for frequency division multiplexing, and uses electronic signal processing structures that are simpler than those generally associated with time division multiplexing.

SUMMARY OF THE INVENTION

The present invention provides a coherence multiplexed optical data transmission system having a new demodulator that provides an increased data carrying capacity relative to prior coherence multiplexed systems. Alternatively, the present invention provides a demodulator and demodulation method that can replace the demodulator and demodulation method of a lower capacity coherence multiplex system. In such a modified system, the critical adjustment of the demodulator can be accomplished by electronic means, rather than by optical means as with prior demodulators.

The improved demodulator and demodulation method are for use in an optical data transmission system that includes a modulator associated with the demodulator, the modulator including means for receiving an optical carrier signal having a coherence length, and interferometer means. The interferometer means includes modulated and reference arms, each having input and output ends, and means for coupling the optical carrier signal into the input ends of the arms. Radiation from the output ends of the arms is coupled into an optical bus. The optical path length of the modulated arm is varied, based upon an electrical modulation signal representing an input data channel. For each of a plurality of modulation signal values, the modulated and reference arms have a modulator optical path length difference that exceeds the coherence length of the optical carrier signal.

For use in such a system, the demodulator comprises an interferometer, and signal processing means. The interferometer has first and second arms each having first and second ends, and means for coupling radiation from the optical bus into the first ends of the first and second arms. The first and second arms have a demodulator optical path length difference selected such that for each modulation signal value input to the associated modulator, the difference between the modulator and demodulator optical path length differences is less than the coherence length of the optical carrier signal. The signal processing means receives optical first and second arm output signals emerging from the second ends of the first and second arms. The signal processing means processes the arm output signals in combination, so as to produce a pair of electrical output signals that correspond to projections of the complex cross correlation of the first and second arm output signals onto two different lines through the origin in the complex plane. Thus linearly independent pairs of electrical output signals are produced for any two modulation signals that produce modulator optical path length differences that differ from one another by an amount not equal to an integral multiple of a half wavelength of the optical carrier signal.

In a preferred embodiment, the signal processing means comprises first and second optical combining means and phase shifting means. The first optical combining means combines first and second arm output signals to produce first and second optical intermediate signals corresponding to the sum and difference respectively of the arm output signals. The phase shifting means phase shifts the second arm output signal to produce a phase shifted output signal, and the second optical combining means combines the first arm output signal and the phase shifted output signal, to produce third and fourth optical intermediate signals corresponding to the difference and sum, respectively of the first arm and phase shifted output signals. Photodetectors convert each optical intermediate signal into a corresponding electrical intermediate signal, and the electrical intermediate signals are input to combining means. The first combining means combines (subtracts) the first and second electrical intermediate signals to produce the first electrical output signal, and the second combining means combines (subtracts) the third and fourth electrical intermediate signals, to produce the second electrical output signal. In a preferred implementation, the second arm output signal is phase shifted by approximately 90°.

DETAILED DESCRIPTION OF THE INVENTION

Figure 1:
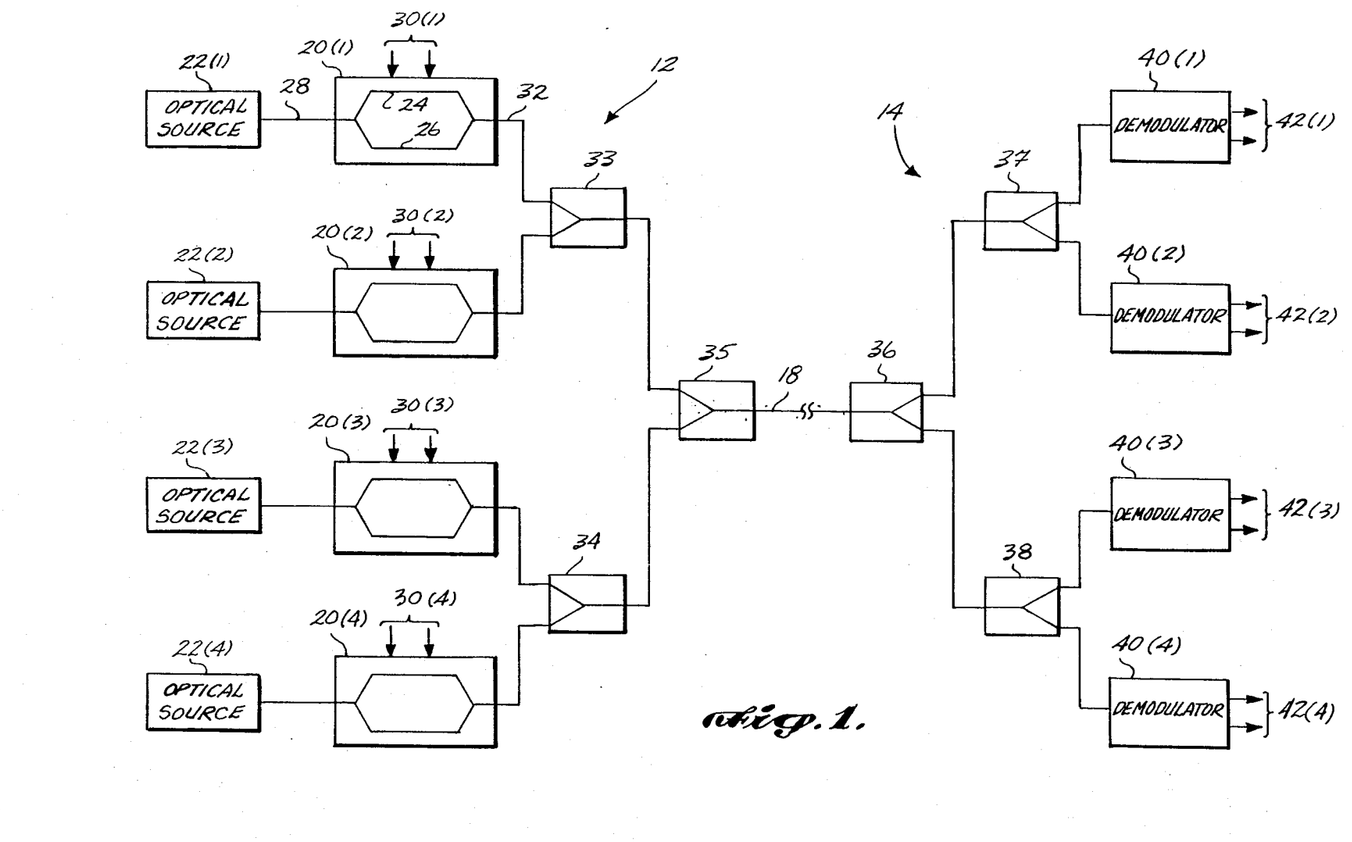
FIG. 1 is a schematic diagram showing a multiplexed optical data transmission system.

FIG. 1 illustrates a coherence multiplexed optical data transmission system utilizing the demodulation technique of the present invention. The data transmission system includes multiplexer 12, demultiplexer 14, and an optical bus comprising single mode fiber-optic cable 18. A four channel system is illustrated, although a larger or a smaller number of channels could naturally also be used. Multiplexer 12 comprises four modulators 20(1)-20(4), each of which is coupled to fiber-optic cable 18. Each modulator 20 receives an optical carrier signal from a respective one of optical sources 22(1)-22(4), and also receives an electrical modulation signal on a corresponding one of input channels 30(1) through 30(4), each input channel carrying a time varying electricl signal representing a serial data stream. Each modulator 20 modulates the optical carrier signal in accordance with the data on its respective input channel, and the modulated carrier signals are combined onto fiber-optic cable 18 via a tree-like structure of 2:1 couplers 33-35. The composite, modulated optical signal is received by demultiplexer 14, and divided between demodulators 40(1) through 40(4) by power splitters 36-38. Each demodulator detects the signal from an associated one of the modulators, by a technique described below, and produces an electrical output signal on the associated one of output channels 42(1) through 42(4). Each electrical output signal corresponds to the electrical modulation signal on the associated one of the input channels.

In prior systems of the type shown in FIG. 1, the modulation signal on each input channel 30 would typically be a binary signal that at any given time would have one of two states, and that binary signal would be reproduced on the associated output channel. As described in greater detail below, in a system using the demodulators of the present invention, the modulation signal on input channel 30 can have one of four states, e.g., a pair of binary signals such as 00, 01, 10, or 11, and the corresponding state will be reproduced on the associated output channel. Thus the data carrying capacity of the system, using the demodulators to be described below, is effectively doubled. In FIG. 1, each input and output channel is shown as comprising two lines, to underscore the fact that 1 of 4 modulation and demodulation is taking place.

In the illustrated embodiment, each modulator 20 comprises an unequal arm-length Mach-Zehnder interferometer that includes a modulated arm 24 and a reference arm 26. Each arm comprises a single mode optical waveguide formed in a suitable electro-optic substrate such as lithium niobate. The modulated and reference arms of each modulator 20 are coupled to the associated optical source 22 by waveguide 28, and the optical carrier signal produced by the optical source is divided evenly between both arms of the modulator. The radiation that passes through these two arms is then combined onto output waveguides 32 that are in turn coupled to fiber-optic cable 18 by couplers 33-35. Each modulator 20 is connected to the electrical signal lines that form the associated input channel. As the signal on the input channel vary, the effective optical path length through modulated arm 24 also varies, thereby phase modulating that portion of the carrier signal that passes through the modulated arm. An example of a modulator of this general type is shown in U.S. Pat. No. 4,340,272.

In general, the optical signals used in the illustrated data transmission system can be carried by any suitable means, such as fiber-optic cables, optical waveguides, etc. In one preferred embodiment, optical waveguides are used within the multiplexer and demultiplexer, and a fiber-optic cable extends from the multiplexer to the demultiplexer. Thus, for example, the entire multiplexer, and the entire demultiplexer, could be fabricated on a single substrate, to produce a structure that is compact, inexpensive, and has readily controlled tolerances. In addition, requirements relating to coherence length and optical path length differences, described below, are most readily achieved in such a system.

The multiplexing technique utilized in connection with the present invention is based upon the phase modulation of the optical carriers within multiplexer 12, and the subsequent detection of that phase modulation by demultiplexer 14. The phase modulation technique can be described with reference to the simplified, nonmultiplexed system shown in FIG. 2, comprising optical source 60, modulator 62, prior art demodulator 64, and single mode fiber-optic cable 66. Modulator 62 comprises an unequal arm-length MachZehnder interferometer that includes modulated arm 70 and reference arm 72, and demodulator 64 comprises an unequal arm-length Mach-Zehnder interferometer that includes first arm 74 and second arm 76, fiber-optic cable or waveguide 80, and a photodetector (not shown) coupled to fiber-optic cable 80. Modulator 62 is fabricated in an electro-optic substrate, and electrodes 78 are positioned adjacent to modulated arm 70 and connected to receive an electrical modulation signal. Modulator 62 is constructed such that in the absence of an electrical modulation signal, there exists an optical path length difference LM between modulated arm 70 and reference arm 72. Thus the lengths of the modulated and reference arms can be designated X+LM and X, respectively. Demodulator 64 is constructed such that arms 74 and 76 have a path length difference of LD, and the optical path lengths of the first and second arms can therefore be designated Y+LD and Y. Path length differences LD and LM are made to be approximately equal to one another and, in particular, the difference between LD and LM is made less than the coherence length $L_s$ of optical source 60.

Figure 2:
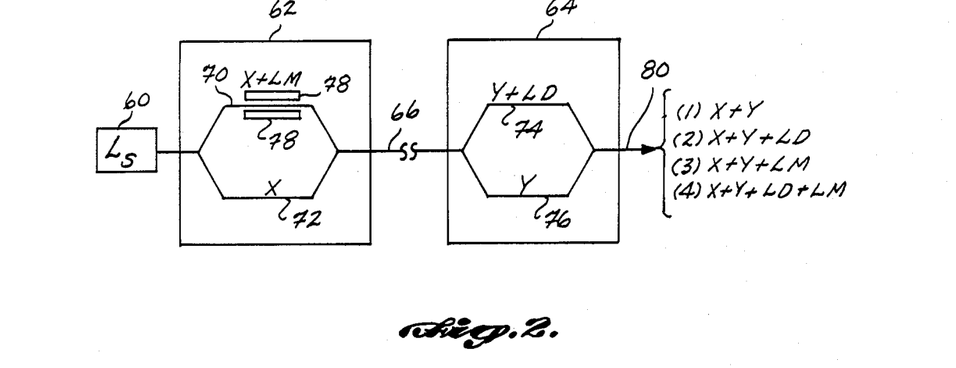
FIG. 2 is a schematic diagram illustrating the phase modulation technique utilized in connection with the system shown in FIG. 1.

As a result of the described arrangement, the optical signal produced on output fiber-optic cable or waveguide 80 includes radiation that has traveled four different paths. Ignoring the common path lengths in the interconnecting cables or waveguides, these paths lengths are:

(1) X+Y
(2) X+Y+LD (3) X+Y+LM
(4) X+Y+LM+LD

Minute variations in the length LM by a variation of the electrical modulation signal on the input channel effectively result in phase modulation of the radiation that has traveled the optical path of length X+Y+LM. The radiation that has traveled the optical path X+Y+LD is unmodulated but, having traveled the same optical path length to within a coherence length of the optical source, is coherent with the modulated radiation. It can therefore serve as a reference carrier for demodulation. Demodulation takes place when these two signals are mixed in a photodiode, a square-law device. The optical signals that have traveled over the paths of lengths X+Y and X+Y+LM+LD contribute only noise to the detection process.

The operation of the system of FIG. 2 can be viewed in another way. Because lengths L and LD are matched to within a coherence length of the optical source, radiation that has traveled the optical path of length X+Y+LD will interfere with radiation that has traveled the optical path of length X+Y+LM. Such interference may be constructive or destructive, depending on the difference between the values L and LD. Therefore, modulation of the value LM by variation of the electrical modulation signal on the input channel will produce intensity modulation of the optical signal on waveguide 80. This optical signal may be converted into an electrical signal by a photodetector, and the photodetector output thereby varies in accordance with the electrical input signal to modulator 62.

It is well known in digital communication theory that when digital phase modulation is demodulated with a single phase reference carrier, as in the prior art system discussed above in connection with FIG. 2, only the cosine of the modulation angle can be recovered. In such circumstances, modulation is generally limited to two phase states. All known prior art demodulators for optical coherence multiplexed or coherence modulated signals suffer from this limitation. The present invention effectively permits demodulation by reference carriers of two phases, separated for example by 90°, thus recovering both the cosine and the sine of the modulation angle. A number of straightforward techniques could be used to produce 1 of 4 modulation, to take advantage of the higher data carrying capacity available as a result of the present invention. For example, two digital input lines could be provided, each connected to a separate pair of electrodes, with one of the electrode pair being twice as long as the other electrode pair.

Figure 3A:
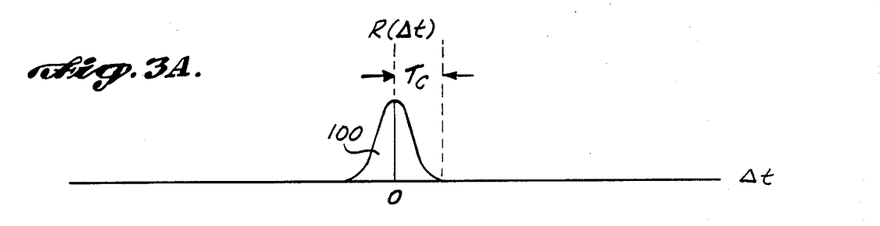
FIGS. 3A-3C are graphs of autocorrelation functions, illustrating the concept behind coherence multiplexing.
Figure 3B:
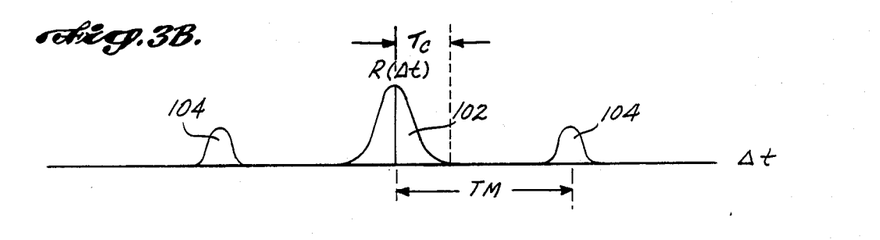
Figure 3C:
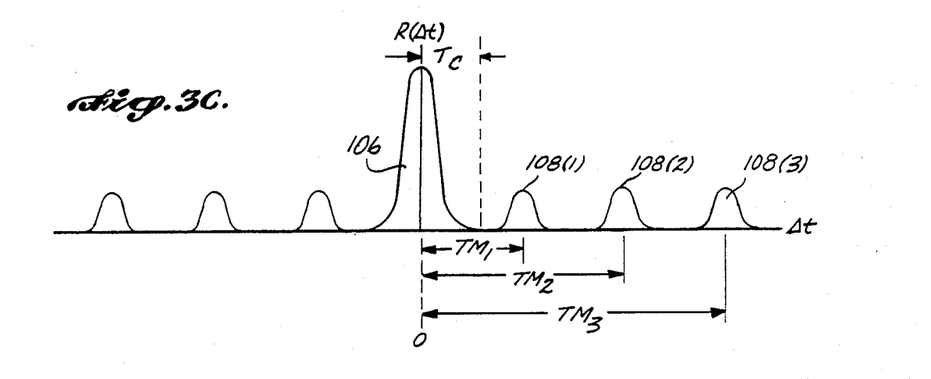

The concept of coherence multiplexing can be explained in somewhat more detail with reference to FIGS. 3A-3C. Every optical signal has an associated autocorrelation function that reveals the degree of interference that can be produced by passing the optical signal through an interferometer having a particular path delay difference $\Delta t$. FIG. 3A illustrates the autocorrelation function $R(\Delta t)$ for a typical optical source. This autocorrelation function consists of a single peak 100 centered at $\Delta t = 0$. FIG. 3A reveals that passing this signal through an interferometer can produce interference only if the interferometer path delay difference is less than $T_c$, which is referred to as the coherence time of the source. The term coherence refers to the ability to interfere. The coherence time $T_c$ is a measure of the phase stability of the source, and is inversely proportional to the width of the corresponding frequency spectrum.

FIG. 3B illustrates the autocorrelation function for radiation from an optical source that has passed through an interferometer, such as one of modulators 20, having a path length difference corresponding to time TM. The autocorrelation function includes central peak 102 and a pair of symmetrically positioned satellite peaks 104 identical to central peak 102 but shrunk to a height equal to one-half that of central peak 102. The satellite peaks are centered at $\Delta t = \pm TM$. Thus as described above in connection with FIG. 2, if radiation having an autocorrelation function such as that shown in FIG. 3B is passed through an interferometer having a path length difference corresponding to time TD, interference can be produced only if the autocorrelation function has a nonzero value at $\Delta t = TD$, which will occur, for example, when TD is approximately equal to $T_M$.

FIG. 3C illustrates the autocorrelation function of an optical signal such as that present on fiber-optic cable 18 in FIG. 1. It is assumed in FIG. 3C that three separate optical signals, all generated from sources having approximately the same coherence time $T_c$, have been passed through three interferometers having path length differences $TM_1$, $TM_2$, and $TM_3$, with the relative magnitudes of the $TM_i$ values as illustrated in FIG. 3C. The resulting autocorrelation function is the sum of the autocorrelation functions of the three interferometer outputs, and consists of central peak 106 and a set of satellite peaks 108(i) centered at times $\pm TM_i$. Each satellite peak 108(i) of FIG. 3C is seen to be logically associated with just one of the interferometers, and the central peak is seen to be associated with all of the interferometers. If the signal represented in FIG. 3C (such as may be present on fiber-optic cable 18 in FIG. 1) is passed through an interferometer with path delay difference TD, for example inside one of the demodulators 40 of FIG. 1, interference can take place if TD is chosen to be close to one of the $TM_i$ values. As discussed above with respect to FIG. 2, it is this interference that reveals the transmitted data.

The usual complex self-coherence function used by practitioners of optics to describe the interfering capabilities of the delayed version of an optical signal differs from the autocorrelation used here by a complex exponential factor that, as $\Delta t$ is increased, rotates in the complex plane at the optical carrier frequency. Further, the drawings in FIG. 3 actually represent complex autocorrelations. That is, at each delay $\Delta t$, the autocorrelation has a phase as well as the plotted magnitude. It is this phase that actually carries the information to be transmitted. In the system shown in FIG. 1, each modulator 20(i) controls the phase of the autocorrelation peak at delay $TM_i$, and this phase determines whether the interference produced by a demodulator interferometer of the same delay will be constructive or destructive.

As shown in FIG. 3C, the various peaks do not overlap. However, if the $TM_i$ values had been chosen differently, overlap could occur. If TD falls on the autocorrelation function at a point where there is overlap of two peaks, optical interference associated with more than one of the modulators will be created, resulting in crosstalk between channels of the demultiplexer. Thus, to avoid crosstalk, certain constraints on the various delay differences in FIG. 1 are necessary. These constraints can be expressed in terms of path delay time differences and coherence times, or by multiplying all times by the velocity of light in the media in question, in terms of path length differences and coherence lengths.

Still referring to FIG. 1, it will be assumed that each modulator 20(i) has a path length difference LM(i) between its modulated and reference arms, and that each demodulator 40(i) has a path length difference LD(i) between its first and second arms. The modulation technique described in connection with FIG. 2 can then be applied to the multichannel system of FIG. 1 by imposing the following constraints: each path length difference LM(i) must be greater than the coherence length of every optical source 22(i); each path length difference LM(i) must differ from the path length difference LM(j) of each other modulator by an amount greater than the coherence lengths of both optical sources 22(i) and 22(j); and a demodulator (i) is associated with each modulator (i) such that the difference between LM(i) and LD(i) is substantially less than (ideally it is zero) the coherence length of optical source 22(i). In a variation of the system shown in FIG. 1 wherein the modulators are serially connected along a single optical bus that is coupled to a single source, an additional constraint would be that each path length difference LM(i) must also differ from the sum of the path length differences of any combination of other modulators.

Under these conditions, modulation of the optical path length of the modulated arm 24(i) of modulator 20(i) will produce variation in the output of the associated demodulator 40(i), but will not cause any variation in the output of any other demodulator. The output signals from each demodulator 40(i) will thereby be determined solely by the electrical modulation signals on input channels 30(i).

Utilization of the above-described techniques in a practical device requires an optical source with an appropriate coherence length, and modulators and demodulators with appropriate path length differences. In a preferred embodiment, each optical source is an edge-emitting light-emitting diode (ELED). Typically, these sources have coherence lengths on the order of 20 microns. For such an embodiment, the modulators could be fabricated with path length differences of 50 microns, 100 microns, etc. to satisfy the above-described conditions. Such path length differences can be achieved by waveguide interferometers using known integrated optic fabrication techniques. In a preferred embodiment, all modulator interferometers 20(i) and couplers 33–35 are fabricated on a single electro-optical substrate, and the entire demultiplexer 14, including couplers 36–38 and the optical components of demodulators 40(i), are also fabricated on a single silicon, glass or electro-optical substrate.

The present invention provides an improved demodulator for use in a coherence-multiplexed optical data transmission system of the general type described above. In such a system, a channel corresponds to a particular time delay on the autocorrelation function of the transmitted optical signal, much as, for example, a channel in a wavelength division multiplexed system corresponds to a particular wavelength in the spectrum of the transmitted signal. The information borne by the channel corresponding to a particular delay is the complex amplitude of the autocorrelation at that delay. Prior art demodulators for coherence multiplexed systems, including the demodulator shown in FIG. 2, have comprised an interferometer and signal processing means, with the path delay difference of the interferometer selecting the channel to be demodulated. Suppose, to simplify the discussion to follow, that this path delay difference is an integral multiple of a period of the optical carrier. (If this is not so, the effect is to rotate the cross-correlation discussed below in the complex plane.) Each of the two interferometer arms presents a single mode optical signal (refer to herein as an arm output signal) to the signal processor. The complex cross-correlation between the complex electric field amplitudes of the arm output signals is equal to the complex autocorrelation of the transmitted optical signal at the delay selected by the interferometer, and thus this cross-correlation bears the information to be demodulated.

This complex cross-correlation can be plotted as a complex phasor, with the real part of the cross-correlation phasor plotted on the horizontal axis and the imaginary part of the cross-correlation phasor plotted on the vertical axis. Each of the modulation states associated with the multiplexer channels selected by the inteferometer corresponds to a distinct position on this phasor diagram. In particular, varying the optical path length of the modulated arm moves the phasor along a circular trajectory centered at the origin, with one full circle corresponding to a change in path length of one wavelength of the optical carrier.

Figure 4A:
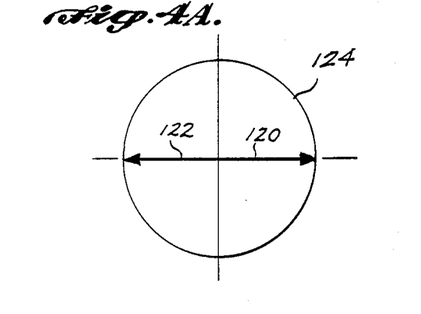
FIGS. 4A-4D are graphs illustrating the phase modulation technique utilized in connection with the system shown in FIG. 1.

In prior coherence multiplexed systems for transmitting binary data, each modulator fixed the optical path length of its modulated arm to one of two values, depending upon whether a binary zero or a binary one was to be transmitted. In order to obtain the greatest separation of the two phasors, the two path length values generally differed by an odd multiple of a half wavelength of the optical carrier. For such a system, in which the two different modulation states differ by 180°, the two allowed states of the transmitted signal can be represented as indicated in FIG. 4A, with two phasors 120 and 122 located at phase angles of 0° and 180° on a unit circle 124.

Figure 4B:
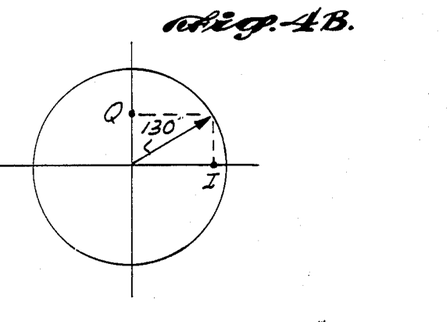
Figure 4C:
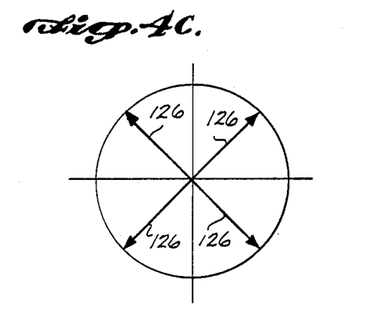
Figure 4D:
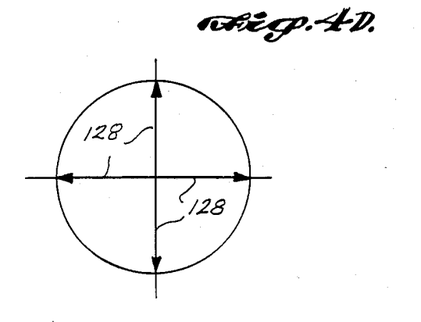

In prior art demodulators, the signal processor output was a single output signal whose amplitude was proportional to the projection of this crosscorrelation phasor onto a line through the origin. By design or adjustment of the optics, this line would be chosen as the line through the two phasors corresponding to the two modulation states. In FIG. 4A, for example, the projection would be onto the horizontal axis. Such a demodulator recovers only one of the two coordinates describing the phasor's position. The demodulator of the present invention differs from prior art demodulators in that its signal processor produces two electrical output signals, corresponding to the projection of the crosscorrelation phasor onto two different lines through the origin. Thus any two input signals that produce modulator optical path length differences that differ from one another by an amount not equal to an integral multiple of half a wavelength of the optical carrier produce two different and linearly independent output signal pairs. Because the lines and the corresponding output signals are distinct, each combination of output signals corresponds to a single possible phasor position. If the two lines are the two axes, as they are in a preferred embodiment, the two output signals can be viewed as the sine and cosine of the phase modulation angle. Thus referring to FIG. 4B, one outupt signal I can be viewed as comprising the projection of phasor 130 onto the real axis, while the other output signal Q can be regarded as a projection of phasor 130 onto the imaginary axis. If the two lines onto which the phasor are projected are not the real and imaginary axes, a transformation of the type described below can be applied to produce the desired axis projection outputs. By using both output signals, the data carrying capacity of the channel can be doubled, and each modulator can apply one of four path length differences to the modulated arm of the interferometer, to thereby encode one of four signals, e.g., 00, 01, 10 or 11. In a preferred embodiment, the four different modulation states are represented by phasors 126 in FIG. 4C, or phasors 128 in FIG. 4D. The arrangement in FIG. 4C is preferred, since the output signals can be produced merely by determining the signs (+or −) of the I and Q signals.

Figure 5:
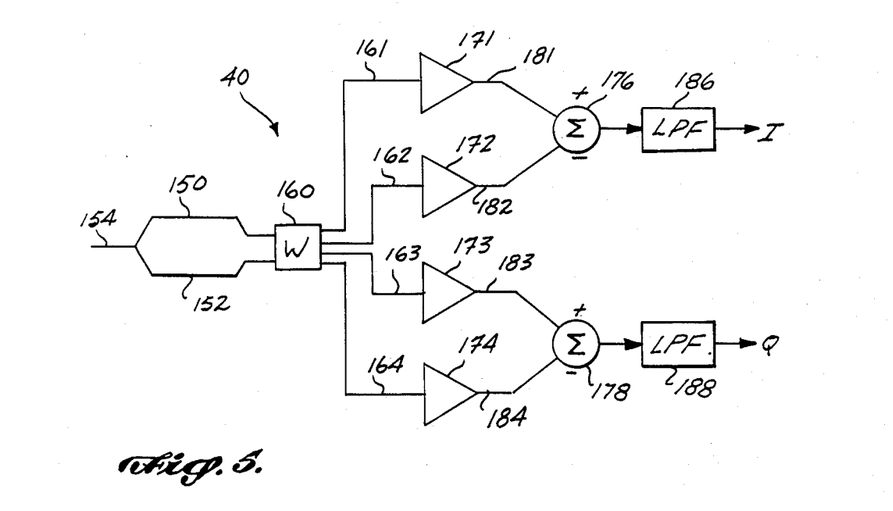
FIG. 5 is a schematic diagram showing a preferred embodiment of the demodulator of the present invention.
Figure 6:
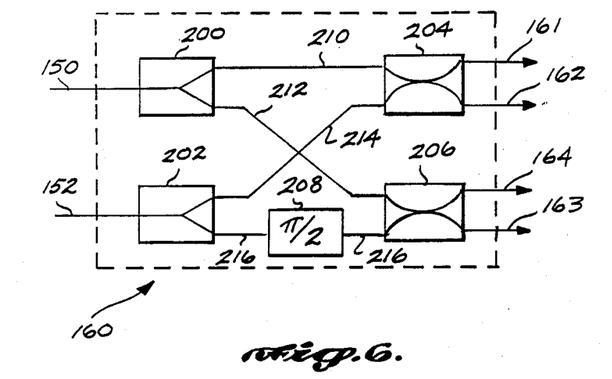
FIG. 6 is a schematic diagram showing a preferred embodiment of the coupler.

One preferred embodiment of a demodulator for producing the I and Q signals is set forth in FIGS. 5 and 6. Referring initially to FIG. 5, demodulator 40 includes first and second arms 150 and 152 respectively that have an optical path length difference (or equivalently a differential delay $\Delta t$) therebetween. Radiation input to the demodulator on optical waveguide 154 is divided equally between arms 150 and 152, and the radiation existing from the arms is input to coupler 160. Coupler 160 divides the radiation, in a manner described below, between four output waveguides 161–164, and radiation in the output waveguides is input to respective photodetectors 171–174. For the present discussion, it will be assumed that the operation of coupler 160 on its two input signls, to produce its four signals, can be represented by a $4 \times 2$ complex matrix W having elements $W_{km}$, with index k representing one of the four output signals, and index m representing one of the two input signals.

Each photodetector produces an electrical signal corresponding to the intensity (i.e., to the amplitude squared) of its associated input optical signal. The electrical output signals of photodetectors 171 and 172, on lines 181 and 182 respectively, are input to summing (subtraction) circuit 176, and the output of the summing circuit is passed through low pass filter 186 to produce output signal I. Similarly, the electrical signals produced by photodetectors 173 and 174, on lines 183 and 184 respectively, are subtracted by summing circuit 178, and the output of summing circuit 178 is passed through low pass filter 188 to produce output signal Q.

To analyze the operation of the demodulator in the simplest case, suppose that the incoming optical signal on waveguide 154 is represented by its complex envelope r(t), and that r(t) is a zero-mean, wide-sense stationary, circular random process with autocorrelation function $R(\Delta t)$. The complex-envelope vector produced by coupler 160 is just W times the input complex-envelope vector. If the input to the coupler 160 from arm 150 is $r(t)/\sqrt{2}$ (ignoring in both arms, the amount of delay of the top arm), the input from arm 152 is $r(t-\Delta t)e^{-j\Omega \Delta t}$, where $\Delta t$ is the delay of the bottom arm less the delay of the top arm, and $\Omega$ is the optical carrier frequency. It follows that the k-th output of the coupler, $x_k(t)$, is:

$$x_k(t) = \frac{1}{\sqrt{2}} [W_{K1}r(t) + W_{k2}r(t - \Delta t)e^{-j\Omega \Delta t}]$$

where k values of 1, 2, 3, and 4 correspond to waveguides 161, 163, 162, and 164 respectively, and to photodetectors 171, 173, 172, and 174 respectively. The power $P_k$ incident on detector k is therefore $$P_k = \frac{E\{|x_k(t)^2|\}}{2}$$
$$= \gamma P_r + \frac{1}{2} Re\{W_{k1}W^*_{k2}e^{j\Omega \Delta t} R(\Delta t)\}$$

where $P_r$ is the power in the signal r(t), and $$\gamma = \frac{1}{2} \{|W_{k1}|^2 + |W_{k2}|^2\}$$

The parameter $\gamma$ is independent of k, assuming that the coupler distributes input power uniformly across the outputs. Now suppose a receiver output is formed as follows:

$$y(t) = \rho\{P_1 - P_3 + j(P_2 - P_4)\}$$

where $\rho$ is the photodetector responsivity. The $\gamma P_r$ terms cancel, leaving $$y(t) = \frac{\rho}{2} Re\{[W_{11}W^*_{12} - W_{31}W^*_{32}] e^{j\Omega \Delta t}R(\Delta t)\} +$$
$$j\frac{\rho}{2} Re\{[W_{21}W^*_{22} - W_{41}W^*_{42}] e^{j\Omega \Delta t} R(\Delta t)\}$$

As described below, the coupler W may be implemented such that it has the phasing property $$W_{k1}W^*_{k2} = (-j)^{k-1} W_{11}W^*_{12}$$

so that $$y(t) = \rho W_{11}W^*_{12} e^{j\Omega \Delta t}R(\Delta t)$$

If the coupler is lossless, then each element of W has magnitude $\frac{1}{2}$, and $$W_{11}W^*_{12} = \frac{1}{4} e^{j\theta}$$

for some fixed $\theta$. The receiver output can then be written in its simplest form $$y(t) = \frac{\rho e^{j(\Omega \Delta t + \theta)}}{4} R(\Delta t)$$

Thus if the two demodulator outputs I and Q are viewed as a complex number y(t)=I+jQ, one can determine from y(t) the value of the input autocorrelation function at time shift $\Delta t$. Most coherence multiplexing communication systems phase modulate the value of the autocorrelation function $R(\Delta t)$, with different channels corresponding to different values of $\Delta t$. Digital data in previously proposed systems has been transmitted using only two phases for each $\Delta t$, because those systems ony recover the real part of the autocorrelation function in the demodulator. With the entire complex autocorrelation function available, it is possible to use four phases, to thereby double the data carrier capacity of each channel.

One preferred implementation for coupler 160 is set forth in FIG. 6. The illustrated coupler includes power splitters 200 and 202, 3 dB couplers 204 and 206, and 90° ($\pi/2$) phase shifter 208. The signal from arm 150 is input to power splitter 200, which divides the optical power in arm 150 between optical waveguides 210 and 212. Similarly, the optical signal on waveguide 152 is input to coupler 202, and divided between waveguides 214 and 216. The optical signal on waveguide 216 is passed through phase shifter 208, which may be implemented simply by providing additional path length, equivalent to a time delay of $\pi/2\Omega$ seconds, in waveguide 216, compared to the path lengths in waveguides 210, 212 and 214. The signals on waveguides 210 and 214 are input to 3dB coupler 204, to produce sum and difference signals on waveguides 161 and 162. Similarly, the optical signals on waveguides 212 and 216 are input to coupler 206, to produce the sum and difference signals on lines 163 and 164.

If it is assumed that each power splitter has a coupling matrix of $$\frac{1}{\sqrt{2}}\begin{bmatrix}1\\1\end{bmatrix}$$

that each 3 dB coupler has a coupling matrix of $$\frac{1}{\sqrt{2}}\begin{bmatrix}1 & 1\\1 & -1\end{bmatrix}$$

and that the phase shifter 208 has a coupling matrix equal to $-j$, then the overall 2×4 coupler W has a coupling matrix equal to $$\frac{1}{2}\begin{bmatrix}1 & 1\\1 & j\\1 & -1\\1 & -j\end{bmatrix}$$

It will be appreciated by those skilled in the art that the phase shift introduced by phase shifter 208 need not be exactly 90°. In that case, a line onto which the modulation point is projected in FIG. 4B to produce the Q signal will not be the vertical axis. The Q signal will instead correspond to the projection of the modulation point onto some other line through the origin; this line makes an angle to the horizontal axis equal to the value of the phase shift 208. For the set of modulation points shown in FIG. 4C, a small deviation from 90° in the phase shift 208 will not result in much error in Q. A phase shift of 0° or 180° would clearly be inappropriate, since the I and Q channels would then contain the same incomplete information about the modulation phase.

Figure 7:
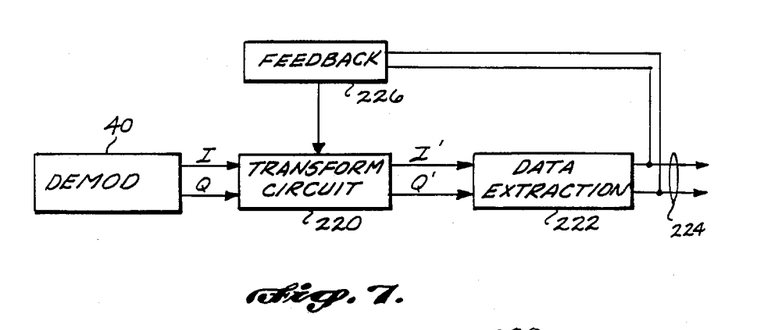
FIG. 7 illustrates a feedback technique for maintaining optimum phase separation.
Figure 8:
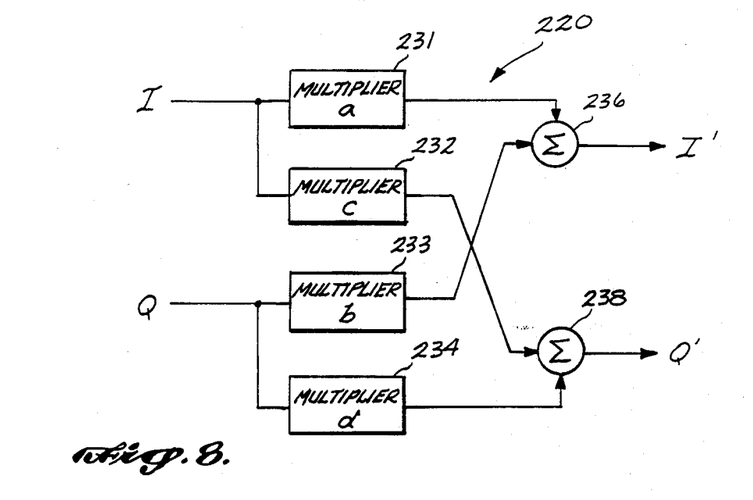
FIG. 8 illustrates a preferred embodiment of the transform circuit.

In general, any particular demodulator will introduce small phase errors, and may further introduce errors if the conversion efficiencies of photodetectors 171–174 differ from one another. In general, a phase error will result in a rotation of the points shown in FIGS. 4C and 4D about the origin, while amplitude errors will change the nominal circle on which these points lie into an ellipse. Both types of errors can be corrected by suitable transformations applied to electrical output signals I and Q. Such a system is illustrated in FIGS. 7 and 8. In FIG. 7, the output signals I and Q of demodulator 40 are input to transformation circuit 220, circuit 220 applying, for example, a linear transformation to the I and Q signals to produce output signals I' and Q' that are input to data extraction circuit 222. A suitable transformation circuit is shown in FIG. 8, wherein multipliers 231–234 multiply their respective input signals by the constants a, b, c and d, and summers 236 and 238 combine the results as shown, to produce transformed signals I' and Q' corresponding to the linear transformation.

$$\begin{bmatrix}I'\\Q'\end{bmatrix}=\begin{bmatrix}a & b\\c & d\end{bmatrix}\begin{bmatrix}I\\Q\end{bmatrix}$$

Data extraction circuit 222 examines the I' and Q' signals to determine the modulation state (e.g., ++, +−, −+, or −−), to produce output data on lines 224. The output signals are also returned to feedback circuit 226, and the feedback circuit produces appropriate signals to modify constants a, b, c and d, to produce the optimum separation of the signals. In general, this technique is known as decision directed feedback, and assumes that one knows the appropriate output data states, so that one can examine the actual output states and determine the error therebetween. The error can be used to drive the feeback loop that minimizes the error.

In a sensor system (as opposed to a communication system), sometimes only one of the dual channels provided by the present invention is of interest, but both channels could be used, as per FIGS. 7 and 8, to adjust the phase for optimum data separation. For an analog sensor, one would of course need some way of specifying what the output should be at a particular point in time, in order to establish the feedback constants.

While the preferred embodiments of the invention have been illustrated and described, variations will be apparent to those skilled in the art. For example, all modulators may be connected in parallel to fiber-optic cable 18, with all modulators connected to a single optical source, or with a separate optical source for each modulator. Accordingly, the invention is not to be limited to the described embodiments, and the true scope of the invention is to be determined by reference to the following claims.

The embodiments of the invention in which an exclusive property or privilege is claimed are defined as follows:

1. An improved demodulator for use in an optical data transmission system, the system including a modulator associated with the demodulator, the modulator including means for receiving an optical carrier signal having a coherence length, interferometer means including modulated and reference arms each having input and output ends, means for coupling the optical carrier signal into the input ends of the arms and means for coupling radiation from the output ends of the arms into an optical bus, means for modulating the optical path length of the modulated arm based upon an electrical modulation signal representing an input data channel such that for each of a plurality of modulation signal values, the modulator and reference arms have a modulator optical path length difference that exceeds the coherence length of the optical carrier signal, the demodulator comprising:

an interferometer having first and second arms each having first and second ends, and means for coupling radiation from the optical bus into the first ends of the first and second arms, the first and second arms having a demodulator optical path length difference selected such that for each of said modulation signal values, the difference between the modulator and demodulator optical path length differences is less than the coherence length of the optical carrier signal; and signal processing means connected to receive optical first and second arm output signals emerging from the second ends of the first and second arms respectively, and the signal processing means including means for processing the arm output signals in combination so as to produce a pair of electrical output signals such that linearly independent pairs of electrical output signals are produced for any two modulation signals that do not produce modulator optical path length differences that differ from one another by an integral multiple of a half wavelength of the optical carrier.

2. The demodulator of claim 1, wherein the signal processing means comprises first optical combining means for combining the first and second arm output signals to produce first and second optical intermediate signals corresponding to the sum and difference respectively of the arm output signals, phase shifting means for phase shifting the second arm output signal to produce a phase shifted output signal, second optical combining means for combining the first arm output signal and the phase shifted output signal to produce third and fourth optical intermediate signals corresponding to the difference and sum respectively of the first arm and phase shifted output signals, photodetector means for converting each optical intermediate signal into a corresponding electrical intermediate signal, first electrical summing means for combining the first and second electrical intermediate signals to produce the first electrical output signal, and second electrical summing means for combining the third and fourth electrical intermediate signals to produce the second electrical output signal.

3. The demodulator of claim 2, further comprising transform means for applying a linear transformation to the first and second electrical output signals to thereby produce transformed output signals such that a difference between electrical output signals produced by two different input signal values is increased.

4. The demodulator of claim 3, further comprising feedback means coupled to the transform means for modifying the transformation applied by the transform means so as to maximize the difference between the electrical output signals.

5. The demodulator of claim 2, wherein the second arm output signal is phase shifted by approximately 90 degrees.

6. An improved demodulation method for use in connection with an optical data transmission system, the system including a modulator including means for receiving an optical carrier signal having a coherence length, interferometer means including modulated and reference arms each having input and output ends, means for coupling the optical carrier signal into the input ends of the arms and means for coupling radiation from the output ends of the arms into an optical bus, means for modulating the optical path length of the modulated arm based upon an electrical modulation signal representing an input data channel such that for each of a plurality of modulation signal values, the modulator and reference arms have a modulator optical path length difference that exceeds the coherence length of the optical carrier signal, the demodulation method comprising:

providing an interferometer having first and second arms each having first and second ends;

coupling radiation from the optical bus into the first ends of the first and second arms such that optical first and second arm output signals emerge from the second ends of the first and second arms respectively, the first and second arms having a demodulator optical path length difference selected such that for each of said modulation signal values, the difference between the modulator and demodulator optical path length differences is less than the coherence length of the optical carrier signal; and processing the arm output signals in combination so as to produce a pair of electrical output signals such that linearly independent pairs of electrical output signals are produced for any two modulation signals that do not produce modulator optical path length differences that differ from one another by an integral multiple of a half wavelength of the optical carrier.

7. The method of claim 6, wherein the processing step comprises combining the first and second arm output signals to produce first and second optical intermediate signals corresponding to the sum and difference respectively of the arm output signals, phase shifting the second arm output signal to produce a phase shifted output signal, combining the first arm output signal and the phase shifted output signal to produce third and fourth optical intermediate signals corresponding to the difference and sum respectively of the first arm and phase shifted output signals, converting each optical intermediate signal into a corresponding electrical intermediate signal, combining the first and second electrical intermediate signals to produce the first electrical output signal, and combining the third and fourth electrical intermediate signals to produce the second electrical output signal.

8. The method of claim 7, comprising the further step of applying a linear transformation to the first and second electrical output signals to thereby produce transformed output signals such that a difference between electrical output signals produced by two different input signal values is increased.

9. The method of claim 8, comprising the further step of modifying the transformation so as to maximize the difference between the electrical output signals.

10. The method of claim 7, wherein the second arm output signal is phase shifted by approximately 90 degrees.

11. An optical data transmission system, comprising:

a modulator including means for receiving an optical carrier signal having a coherence length, interferometer means including modulated and reference arms each having input and output ends, means for coupling the optical carrier signal into the input ends of the arrrows and means for coupling radiation from the output ends of the arms into an optical bus, means for modulating the optical path length of the modulated arm based upon an electrical modulation signal representing an input data channel such that for each of a plurality of modulation signal values, the modulator and reference arms have a modulator optical path length difference that exceeds the coherence length of the optical carrier signal; the demodulator comprising:

a demodulator comprising an interferometer having first and second arms each having first and second ends, and means for coupling radiation from the optical bus into the first ends of the first and second arms, the first and second arms having a demodulator optical path length difference selected such that for each of said modulation signal values, the difference between the modulator and demodulator optical path length differences is less than the coherence length of the optical carrier signal, and signal processing means connected to receive optical first and second arm output signals emerging from the second ends of the first and second arms respectively, the signal processing means including means for processing the arm output signals in combination so as to produce a pair of electrical output signals such that linearly independent pairs of electrical output signals are produced for any two modulation signals that do not produce modulator optical path length differences that differ from one another by an integral multiple of a half wavelength of the optical carrier.

12. The system of claim 11, wherein the signal processing means comprises first optical combining means for combining the first and second arm output signals to produce first and second optical intermediate signals corresponding to the sum and difference respectively of the arm output signals, phase shifting means for phase shifting the second arm output signal to produce a phase shifted output signal, second optical combining means for combining the first arm output signal and the phase shifted output signal to produce third and fourth optical intermediate signals corresponding to the difference and sum respectively of the first arm and phase shifted output signals, photodetector means for converting each optical intermediate signal into a corresponding electrical intermediate signal, first electrical summing means for combining the first and second electrical intermediate signals to produce the first electrical output signal, and second electrical summing means for combining the third and fourth electrical intermediate signals to produce the second electrical output signal.

13. The system of claim 12, further comprising transform means for applying a linear transformation to the first and second electrical output signals to thereby produce transformed output signals such that a difference between electrical output signals produced by two different input signal values is increased.

14. The system of claim 13, further comprising feedback means coupled to the transform means for modifying the transformation applied by the transform means so as to maximize the difference between the electrical output signals.

15. The system of claim 12, wherein the second arm output signal is phase shifted by approximately 90 degrees.

* * * * *